Feb. 20, 1968   H. H. FREY ETAL   3,369,538

CANNED FOOD CONTAINER

Filed March 21, 1966

INVENTORS.
H. HOWARD FREY
RICHARD I. BROWN

BY Kirschstein, Kirschstein & Ottinger

ATTORNEYS

United States Patent Office 3,369,538
Patented Feb. 20, 1968

3,369,538
CANNED FOOD CONTAINER
H. Howard Frey, 450 S. 2nd Ave., Mount Vernon, N.Y. 10550, and Richard I. Brown, Mount Vernon, N.Y.; said Brown assignor to said Frey
Filed Mar. 21, 1966, Ser. No. 535,873
9 Claims. (Cl. 126—262)

ABSTRACT OF THE DISCLOSURE

A canned food container composed of a sheet metal can which is subdivided by a sheet metal transverse partition into an upper food compartment and a lower heating compartment. In the food compartment is a foodstuff including a vaporizable liquid. A jellied alcohol is disposed in the heating compartment. There is a vent opening in the top wall of the food compartment. There are two diametrically opposed flue vents in the side wall of the heating compartment. A single strip covers the vent in the top wall, runs down the side wall to cover one of the flue vents and then runs around the side wall to cover the other flue vent. The strip is secured for its entire length to the outside of the container, except for its free end adjacent to the vent in the top wall so that the strip only can be pulled so as to open the vent in the top wall before opening the flue vents. The strip is disconnected from the container without tools by manually grasping its free end and pulling, only a few pounds of effort being required.

---

This invention relates to a canned food container with a built-in heater and with manually openable venting means for flue and relief purposes.

There are many products on the market which are useful in containing and transporting food supplies for emergency use when electric power and/or gas has failed, and for camping, picnic and similar uses where primitive conditions may prevail and where it is not feasible to cook food as one would at home. Perhaps the most familiar food supplies of this type are dry rations used by the Armed Forces. Also, many foods are prepared (precooked) for immediate consumption some with and some without the need for heating and/or the addition of liquid to the same, and suitable containers to carry, preserve and protect such products have been provided. Some of these containers are designed to be easily portable, some are made extremly rugged, i.e., they can be exposed to physical abuse without being broken or having the contents thereof become spoiled, and many are air- and water-tight.

Most of the foods of the type described above are adapted to be eaten in the form in which they are furnished, i.e., dry and/or without being heated. Generally excluded are foods which must be heated before consumption. The last mentioned category is a very large one and includes many staple items desirable in emergency and related situations. Indeed, a wide variety of canned foods is in this category. Generally, canned foods are very well adapted for use under primitive conditions since the cans are rugged, water-tight, air-tight, conveniently carried and are capable of containing a wide variety of foods including those that must be stored in an airless medium, i.e. in a vacuum, or under a blanket of an inert gas. Nevertheless, many of these canned foods are not useful where primitive conditions prevail. They are of the type which people are accustomed to eat hot or warm, and often heat is not available in the emergency or other similar situation. Even the fact that the food can be heated in the cans themselves does not help if a source of heat is unavailable.

Generally, the types of primitive conditions contemplated herein are those caused by floods, earthquakes, hurricanes, tornados, rain storms, shipwrecks, camping and boating in very remote areas, air raids, battle conditions and the like. All of the foregoing situations share a common absence of the normal adjuncts of civilization, i.e. electricity, gas, water, shelter and so on.

The present invention is basically concerned with canned food containers having therein a food of the type which is adapted to be heated before consumption and which includes therein a component, e.g. water, which is at least partially transformed into gas upon heating of the food to a temperature desirable for ingestion. It is readily apparent that such cans of food can hardly serve their purpose unless means is available to heat their contents. A can including its own unitary means for providing the necessary heat would obviously be a most useful device in the emergency or other primitive conditions discussed above. Such a container would greatly enlarge the range of foods useful in such conditions, as well as constituting a means for furnishing basic foods in the first place in such situations.

Although attempts have been made in the past to provide cans with a self-contained source of heat, these have failed for a number of reasons among which two principal ones stand out. One is that the can loses its air- and water-tightness in the adaptation thereof to include a source of heat. The other is the danger of explosion if the heat source is activated without opening the food compartment. Since the heat transforms a part of the liquid component of the food, usually water, to a gas (steam), the pressure built up during cooking will explode the can unless a relief vent for the gas is provided. The two drawbacks just mentioned are not unrelated since efforts at preserving the integrity of the can usually have created a situation where the danger of explosion is present.

It is a principal object of the present invention to provide a canned food container with a built-in heater which container is air-tight, water-tight, and rugged, and which cannot explode in use, i.e. upon heating the same.

It is another object of the present invention to provide a can of the character described which can be easily opened even under extremely adverse conditions by an inexperienced, inept or weakened person and opened in such a manner that upon heating thereof there is no danger of explosion.

It is another object of the present invention to provide a can of the character described which retains all of its properties as a sealed food container.

It is another object of the present invention to provide a can of the character described which can be used with a wide variety of foods.

It is another object of the present invention to provide a can of the character described which can be easily mass-produced and mass-filled.

Other objects of the invention in part will be obvious and in part will be pointed out hereinafter.

The invention accordingly consists in the features of construction, combinations of elements, and arrangements of parts which will be exemplified in the canned food containers hereinafter described and of which the scope of application will be indicated in the appended claims.

In the accompanying drawings, in which there are shown two of the various possible embodiments of the invention:

Generally, the objects of the present invention are achieved by providing for shipment and sale a conventional can-type hermetically sealed food compartment fabricated, for example, from tin plate or some other heat conductive material and assembling therewith, as an adjoining integral extension thereof, a heating compartment in which there is located an activatable and readily ignitable but still idle heat source, i.e., fuel. The food compartment contains a food which is adapted to be heated before being consumed and includes a component such as water which is at least partially transformed into a gas upon heating for consumption. The heat source desirably is of a solid type not subject to decomposition or explosion or loss of effectiveness under conditions of or as a result of being exposed to extreme heat or cold. Preferably the fuel is volatile to facilitate ignition and burning, loss by vaporization during storage being prevented by the hermetic nature of the heating compartment. The top of the food compartment is provided with a first manually openable venting means for relief purposes, i.e. for escape of steam or the like, and the heating compartment is provided with two second manually openable venting means for flue purposes, i.e. for admission of air and exhaust of combusted gases. Unitary means is provided on the outside of the container to facilitate the operation of the two manually openable venting means. Said operating means is conveniently and easily actuated by application of a few pounds of force and without requiring the use of any tools.

Pursuant to the invention, the aforesaid operating means is so constructed and positioned on the container that the first venting means for relieving pressure in the food compartment must be opened before either of the second venting means of the heating compartment can be opened. In this way, the can, including both the food and heating compartments, preserves its initial sealed character until it is desired to use it, and when the can is in use, i.e. being heated, an explosion cannot occur because the fuel of the heating compartment cannot be activated unless and until an operable relief vent is opened in the food compartment.

Figure 1:
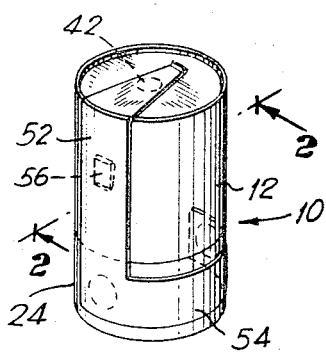
FIG. 1 is a perspective view of a can constructed in accordance with the present invention.
Figure 2:
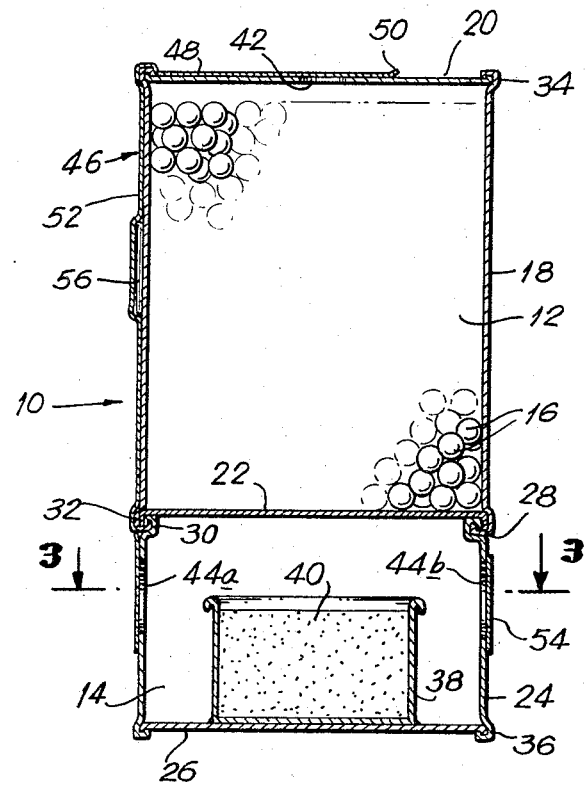
FIG. 2 is an enlarged sectional view taken substantially along the line 2—2 of FIG. 1.
Figure 3:
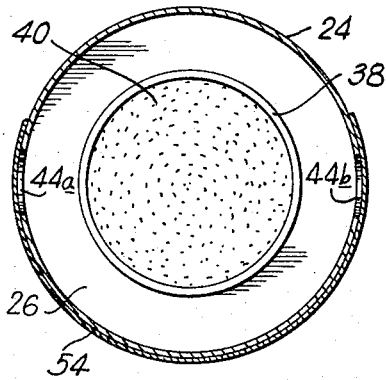
FIG. 3 is a sectional view taken substantially along the line 3—3 of FIG. 2.

Referring now in detail to the drawings, and more particularly to FIGS. 1 through 3, the reference numeral 10 denotes a so-called "tin" (tin plated sheet steel) can embodying one form of the instant invention. Said can includes a food compartment 12 and a heating compartment 14. The compartment 12 contains a food adapted to be heated, the same including a component which upon heating becomes gaseous. For example, the compartment 12 includes baked beans 16 in the usual water-based sauce.

The food compartment comprises a cylindrical side wall 18, a top 20 and a transverse partition 22 which serves both as a bottom for such compartment and as a top for the heating compartment 14. The last-mentioned compartment includes in addition to the aforesaid partition, a cylindrical side wall 24 and a bottom 26. The two compartments are mutually joined and hermetically sealed from one another by crimping together the bottom end 28 of side wall 18 and the top end 30 of wall 24 with a depending flange 32 of the partition securely held between said ends. The top 20 of the food compartment is secured to the top end 34 of the side wall 18 by crimping, and the bottom 26 of the heating compartment is similarly secured to the bottom end 36 of the wall 24. All of the foregoing securements constitute hermetic seals, and can best be seen in FIG. 2. To further enhance the hermetic character of the seals, solder bonds may be included at all facing surfaces.

A fuel container 38 is provided on the top surface of the bottom 26 of the heating compartment. Said container may be in the form of a metal cup, the bottom of which is secured as by brazing, soldering, welding or an adhesive to the aforesaid surface. The fuel 40 is preferably of a solid type such as Sterno (methyl alcohol in a petroleum jelly base) which does not lose its heating capacity on exposure to or wide fluctuation of ambient temperatures or through passage of time, providing that it is enclosed in a hermetically closed compartment. The top of the cup is open to expedite ignition, this being acceptable under the circumstances, to wit, the disposition of the cup in a closed compartment. Such use of an open top avoids the necessity of removing the cap from the heating fuel cup to open the same, as by removal of a lid, before it can be lighted.

A relief vent 42, i.e. opening, is formed in the top 20 of the food compartment 12, and two spaced flue vents 44a and 44b, i.e. openings, are formed in the side wall 24 of the heating compartment 14. The flue vents are of such size that when both are opened, air can readily enter the heating compartment and exhaust gases can readily escape, so the fuel when lighted will burn vigorously. Preferably, they are diametrically opposed to one another and at least one is at about the level of the top of the cup to enable the fuel to be lighted easily.

Pursuant to the invention a strip off cover comprising a flat, elongated L-shaped flexible sheet 46 is provided which hermetically seals the relief vent 42 and hermetically seals the flue vents 44a and 44b. Said sheet may be of metal or plastic and is so located that it can only be opened initially from the end sealing the relief vent, so that neither of the flue vents can be unsealed until the relief vent has first been opened. Said sheet has a top component 48 which extends across the upper surface of the top of the food compartment and seals the relief vent. It is secured to the top 20 in the area immediately adjacent and, without interruption, surrounding the relief vent. A metal film would desirably be fabricated from soft aluminum or soft tinned steel thin enough, e.g. 2 mils, to be flexible. Such a sheet is hermetically secured to the outer surface of the container as by cold pressure welding, roll welding, soldering or cementing. The bond between the sheet and the surface of the container is weak enough to be ruptured by the application of a few pounds of pulling force on an end of the sheet. An example of a plastic usable pursuant to the invention would be a three mil pellicle of cellophane, cellulose acetate or polyethylene hermetically secured to the outer surface of the container by adhesion. For this purpose there may be employed a plastic adhesive or the sheet may be rendered tacky by use of a solvent and adhered to the container, or the sheet may be adhered by the application of heat and pressure.

Said sheet is secured to the container immediately adjacent and, without interruption, surrounds each of the flue vents.

The free end of the component 48 has an integral tab 50 adapted to be grasped and pulled on by a user. In one piece with the component 48 at the end thereof remote from the tab 50 is a side component 52 which extends along and in contact with the outside surface of the walls 18 and 24. A lower component 54 is provided integral with the bottom end of side component 52 and extends perpendicular thereto circumferentially around the outside of the heating compartment 14. All portions of the sheet lie adjacent the outer surface of the container except the pull tab 50, such portions being secured to the container as described above, i.e. tight but strippable under a hand force of two or three pounds. The bond between the sheet and container hermetically seals all the vents. However, because the peripheral areas of the sheet are in face contact with the container, the sheet cannot be stripped from the container by pulling on any edge thereof except the tab 50.

The tab 50 is not bonded to the container and preferably is bent slightly away from the upper surface of the top 20 to permit it to be easily grasped. The sheet is quite thin so that bonded as it is to the container up to its edges it is impossible to grasp it other than at the pull tab. As pointed out, the sheet is adhered to the surface against which it lies along the entire area of the sheet except for the vents and the tab and not merely in the areas around the vents so as to insure that the film can only be grasped at the tab.

Further to the invention, the securement of the film to the can is strong enough to resist accidental dislodgement even when subjected to extremely rough usage and is resistant to heat, water, aging, and extremes of ambient temperature likely to be encountered. The integrity of the food and heat container is thus maintained in the construction of the can and will be maintained even if the can is subjected to rough usage and extremes of temperature. However, the bond between the film and the surfaces to which it is secured is weak enough to permit manual stripping of the film from said surfaces by a user pulling on the tab and using only his own strength and unaided by tools. The bond must not be strong enough to require more than a few pounds of pull on the sheet to break it.

The parts of the container are assembled to one another and the food compartment is filled in a conventional manner, the cup 38 being attached to the bottom 26 before the latter is assembled.

The container is used as follows: When it is desired to employ the same, the tab 50 is grasped and pulled so as to unseal the sheet around and thereby open the relief vent 42. Then pulling is continued until first flue vent 44a and then the second flue vent 44b are opened. At this point, the fuel in the fuel compartment can be lighted. The fuel source is so proportioned with respect to the food compartment of the can that the heat furnished thereby will sufficiently heat the food in the food compartment within the normal or an appropriate time required to prepare the same for eating. The heat passes by conduction through the partition 22 and along the walls of the two compartments to the food which is heated thereby. It will be observed that by so constructing the sheet and so sealing it to the container that it is only possible to rip it off by pulling on the tab 50 and thus opening the relief vent before the fuel vents, the possibility of a user activating the heat source without previously having opened the relief vent is wholly obviated.

A means for activating the fuel can be sealed in or to the container itself. For example, a book 56 of paper safety matches is shown captive between the side component 52 of the sheet and the wall 18 of the food compartment in FIG. 2, the match book being disposed well above the relief vent 44a. The sheet is hermetically sealed to the container all around the match book, and the edges of the sheet surrounding the match book lie flat against the wall of the container. The protrusion of the sheet caused by the presence of the match book is slight preferably a single line of matches being used so that the sheet cannot be grasped at this point.

A means may also be provided for opening the food compartment for eating after the food is cooked. Such means could be a cam opener spot brazed to the top 50 of the food compartment or a similarly attached key adapted to open the food compartment by unwinding a metal seal along the rim thereof as is the case with a coffee can.

It is desired to point out that while the instant invention has been described with respect to a solid food having a gasifiable component, e.g. a liquid surrounding medium, the instant invention is also applicable to purely liquid foods, e.g. soup.

Figure 4:
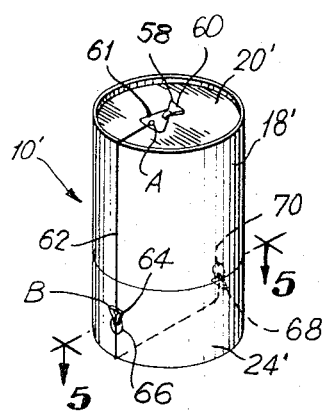
FIG. 4 is a perspective view of a can embodying a modified form of the present invention.
Figure 5:
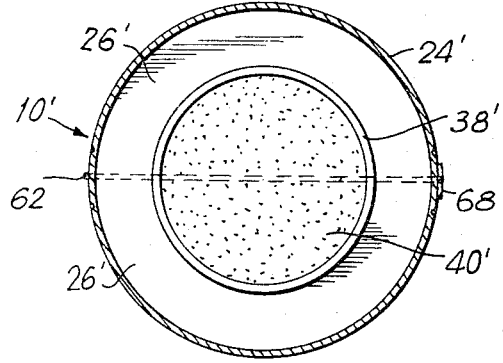
FIG. 5 is an enlarged sectional view taken substantially along the line 5—5 of FIG. 4.

A modified form of the present invention constituting a container 10' is illustrated in FIGS. 4 and 5. Said container is in all respects the same as the container 10 already described except for the manually openable venting means for opening the relief vent of the food compartment before either flue vent of the heating compartment is opened. The parts of the container 10' bear the same numbers as the corresponding part of the container 10 but are primed.

Pursuant to the modified form of the invention, cold pressure welded rip or tearing tag container opening means are provided in place of relief and flue vents covered by a sealing sheet. Said tags are linked together as described below. The tags are themselves described in United States Patent No. 2,946,478. Such tags consist of cold pressure weldable metal, such as aluminum, copper, etc., and each tag overlies the top or other wall portion of the container which also consists of cold pressure weldable material. The tag is attached to the container wall by a closed linear or strip-like indentation pressure welded joint, such as a ring-shaped joint where a circular opening in the container is desired. Due to the reduced cross-section at the weld line or area and to the work hardening of the metal at the weld, an opening conforming to the configuration or contour of the weld line or pattern will be torn in the container wall by severing of the container metal upon tearing or pulling the tag or other detachable member off the container wall without requiring any special opening tool, such as a can opener, opening key or the like.

A manually openable venting means for relief purposes of the type just described is provided in the top of the food container and when pulled out will leave a relief vent. Said venting means includes a tag 58 having a free end 60 which is adapted to be grasped and pulled on. The tag is cold pressure welded along a line to an area 61 the boundary of which is defined by a pressure score line in part including the aforesaid pressure weld line. A wire 62 of suitable metal such for example as soft 30 mil diameter tin plated iron is firmly secured to the area 61 as by welding at a point A on the area spaced from the tag 58. Said wire extends without slack over and adjacent the top 20' of the food compartment and then down the side walls 18', 24' of the food compartment and heating compartment to a second tag 64 which is secured by cold pressure welding to an area 66 such that when pulled out it leaves a flue vent. The area 66 and tag 64 are of the same type as the area 61 and tag 58 abovedescribed. The wire 62 runs from the point A on the area 61 which when removed will leave a relief vent to a weld point B on the tag 64 that is attached to the area 66 which when removed will leave a flue vent. The point B is closer to the point A than is the area 66. The tag 58 is connected to the area 61 at a region more remote from the flue vent tag 64 than the point A. Thereby, until the area 61 is pulled free of the top 20' there is no slack in the wire 62, thus preventing the tag 64 from being pulled in a direction to remove the area 66 from the container before the relief vent is opened.

From the point B the wire 62 continues without slack down the wall 24', and across the bottom surface of the bottom 26' of the heating compartment and up the wall 24' on the side thereof diametrically opposed from the side on which tag 64 is located. The wire terminates at a tag 68 attached to an area 70 which when pulled out leaves a second flue vent. The area 70 is disposed in the wall 24' at a position diametrically opposed to the area 66. The bag 68 is lower than the area 70.

The tag 68 and area 70 are of the same type as the areas and tags previously described. The tag 68 is closer than the area 70 to the point of attachment of the wire 62 to the tag 64 so that the tag 68 cannot be pulled to rip the area 70 from the container until the wire 62 previously has been slackened by ripping the area 66 from the container.

It is within the scope of the present described embodiment of the container to separate the wire into two sections, the first running from point A to point B and the second running from the area 66 to the tag 68. All three tags and the wire (or two wire sections) lie in substantially the same vertical plane, said plane preferably passing through the longitudinal axis of the container.

The wire lies adjacent the walls 18' and 24' and the undersurface of the bottom 26' of the container 10'. It may be secured to these surfaces against which it lies as by soldering, the securement being light enough to be broken by a few pounds of pull.

It is apparent from the foregoing that the tag 64 cannot be manipulated to tear the area 66 free until tag 58 at the top of the can has been manipulated to pull off the area 61 and the wire ripped down to the attachment thereof to tag 64. Similarly the tag 68 cannot be manipulated to pull off the area 70 until the tag 64 has been manipulated to pull off the area 66 and the wire ripped off up to the tag 68. As a result, neither flue vent forming area can be ripped out until after the relief vent forming area has previously been ripped out. The container embodying the modified form of the invention is activated by pulling on the tag 58 until the area 61 is ripped out. The wire is then ripped off the top and down the side of the can until tag 64 is reached, and then area 66 is ripped out. Next, the wire is ripped the rest of the way down the can, across the bottom and up the opposite side until the tag 68 is reached. Then the area 70 is pulled out.

It should be apparent from the foregoing that the instant canned food containers with built-in heaters are extremely useful and have none of the defects of those proposed in the past. All danger of explosion on heating has been eliminated. Also, the integrity of the can has been retained, i.e., the food is hermetically sealed. Still further, the fuel compartment is maintained in sealed condition. And in addition, the can can be easily and quickly activated but not without first opening the relief vent of the food compartment. Cans embodying the present invention are extremely useful for emergency situations, camping, boating and outings of all kinds. They make available a convenient source of food and unitary therewith the means for heating it. Thus, a person in primitive or emergency circumstances would not be limited to dry or cold foods or to eating in cold condition foods which normally are heated before consumption. Still further, the instant containers not only can survive extreme conditions in that the foods are preserved, but the heating means also will survive and be usable. In addition, the fact that the heating means and the can are part of the same package reduces the amount of equipment needed, i.e., separate cooking apparatus or heating means does not have to be included. Even the means for activating the fuel part of the entire package can be included and will be preserved, i.e., not exposed until the can is used. The instant food containers are impervious to heat, water, and to ordinary extremes of temperature, and they can take a great amount of abuse without breaking.

It thus will be seen that there are provided canned food containers which achieve the several objects of this invention and which are well adapted to meet the conditions of practical use.

As various possible embodiments might be made of the above invention, and as various changes might be made in the embodiments above set forth, it is to be understood that all matter herein set forth and shown in the accompanying drawings is to be interpreted as illustrative and not in a limiting sense.

Having thus described the present invention, there is claimed as new and desired to be secured by Letters Patent:

We claim:

1. A container for food that is adapted to be heated for serving and includes a component which is at least partially transformed into a gas upon such heating, said container including a food compartment and an adjoining heating compartment constituting an integral extension of the food compartment, said food compartment being hermetically closed from the ambient medium and from the heating compartment, said heating compartment being hermetically closed from the ambient medium, said container being fabricated of heat conductive material, a heat conductive partition separating the food compartment from the heating compartment, said partition constituting a bottom portion of the food compartment and a top portion of the heating compartment, said food compartment also including a side wall and a top, said heating compartment also including a side wall and a bottom, venting means openable without tools by a direct manual pull of only a few pounds, said means having a first portion hermetically sealed to the food compartment at the top thereof and a second portion hermetically sealed to the side wall of the heating compartment, only said first portion being provided with a free end so that said means is arranged to be openable with respect to the heating compartment only after it has been previously opened with respect to the food compartment, and a burnable fuel disposed in said heating compartment and ignitable only by applying an open flame thereto.

2. A container as set forth in claim 1 wherein the manually openable venting means includes a strip off cover having a first section and a second section, wherein the first portion of the venting means comprises the first section of the cover and means providing a relief vent in the top of the food compartment, said first section of the cover being manually releasably hermetically sealed to the area of the top of the food compartment surrounding said relief vent, and wherein the second portion of the venting means comprises the second section of said cover and means providing a flue vent in the wall of the heating compartment, said second section being manually releasably hermetically sealed to the area of said heating compartment wall surrounding the flue vent.

3. A container as set forth in claim 2 wherein the second portion of the venting means includes a second flue vent diametrically opposed to the first flue vent and wherein the second section of the cover is manually releasably hermetically sealed to the second flue vent around the latter.

4. A food container as set forth in claim 3 wherein the cover consists of a flat elongated sheet, said sheet having a first section lying flat against the top of the food compartment and constituting the first section of the cover and said sheet having a second section lying flat against the walls of the food compartment and heating compartment and constituting the second section of the cover, said first section of the sheet including a first end integral with the second section of the sheet and a second end disposed on the opposite side of the relief vent from said first mentioned end, and a tab on the second end arranged to be grasped manually whereby the sheet can be grasped only at said tab and pulling on the tab necessarily opens the relief vent before any flue vent is opened.

5. A container as set forth in claim 4 wherein the sheet is manually releasably sealed to the top and side walls throughout substantially its entire length except for the tab and the vents.

6. A container as set forth in claim 1 wherein the manually openable venting means includes a wire having a first section lying against the top of the food compartment and a second section lying against the walls of the food compartment and heating compartment, said first section having an end disposed on the top of the food compartment remote from the second section, and wherein the first portion of the venting means comprises the first section of the wire and a first cold pressure welded rip tag in the top of the food compartment, said rip tag having a free end facing in a direction away from the end of the wire, the end of the wire being secured to the tag at a portion remote from said free end, and the second section of the venting means comprising the second section of the wire and a second cold pressure welded rip tag in the wall of the heating compartment, said second tag including a free end facing upwardly, the wire being secured to said free end of said tag, whereby the second rip tag cannot be pulled out before the first rip tag.

7. A container as set forth in claim 6 wherein the second section of the venting means comprises the second section of the wire, the second rip tag, and a third rip tag having a free end facing downwardly, wherein the third rip tag is located in the wall of the heating compartment in diametrically opposed position with respect to the second tag, and wherein the second section of the wire includes an end remote from the first section of the wire, said end being secured to the free end of the third tag so that it cannot be pulled out before the second tag.

8. A container as set forth in claim 7 wherein the wire is secured to the container substantially along the entire extent of the wire.

9. A container as set forth in claim 1 wherein the first portion of the manually openable venting means includes an area of the top connected to the remainder of the top by a weakened zone, wherein the second portion of the manually openable venting means includes an area of the side of the heating compartment connected to the remainder of the side by a weakened zone and wherein a member connects said areas in series so that the second area cannot be broken from the side of the heating compartment before the first area is broken from the top of the food compartment.

References Cited

UNITED STATES PATENTS

| | | | |
|---|---|---|---|
| 1,325,515 | 12/1919 | Hartmann. | |
| 2,327,412 | 8/1943 | Fink. | |
| 2,896,607 | 7/1959 | Eder | 126—262 |
| 3,262,445 | 7/1966 | Stults et al. | 126—262 |

FOREIGN PATENTS

| | | |
|---|---|---|
| 24,009 | 1914 | Great Britain. |
| 195,922 | 5/1938 | Switzerland. |

CHARLES J. MYHRE, *Primary Examiner*.